Patented Apr. 9, 1929.

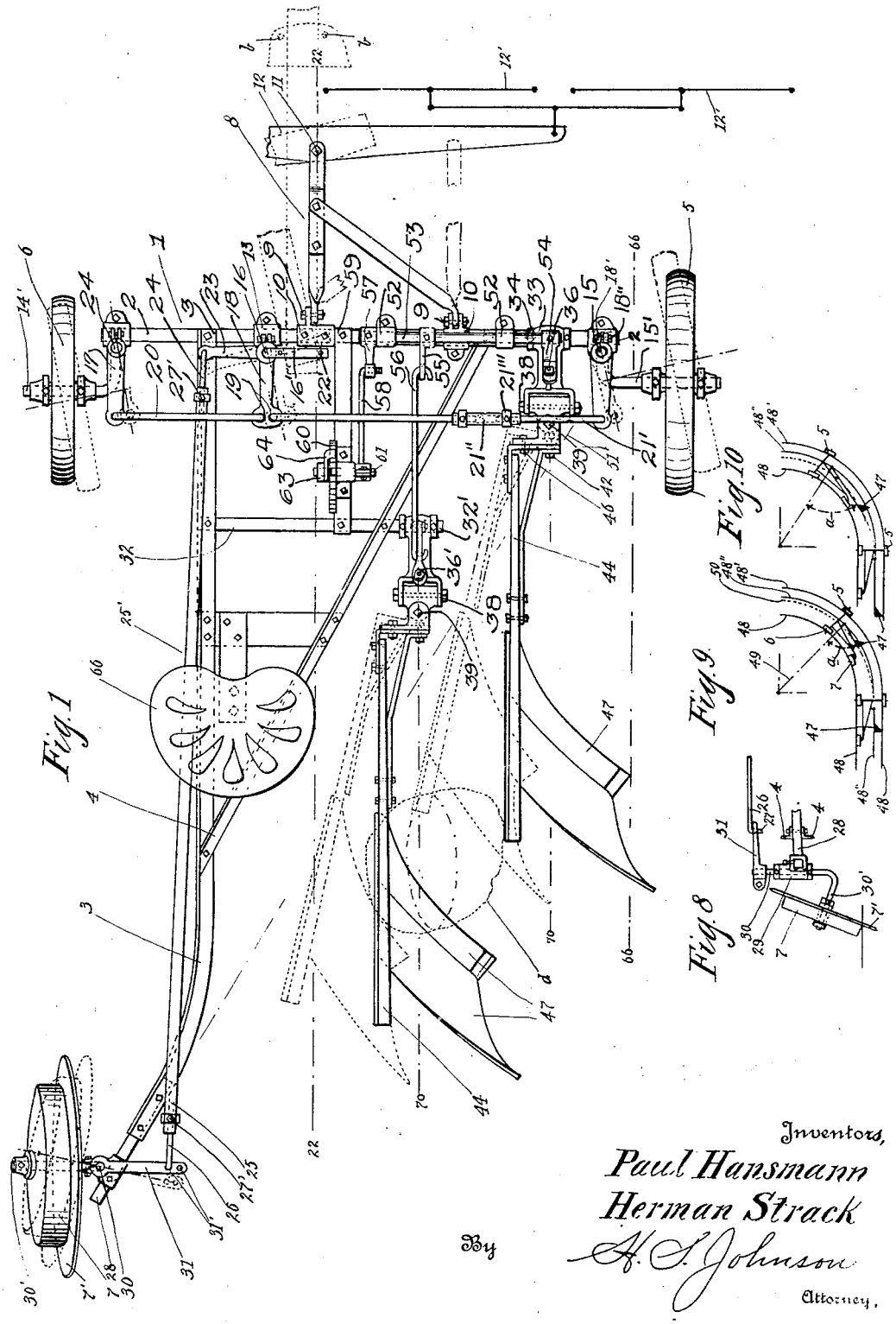

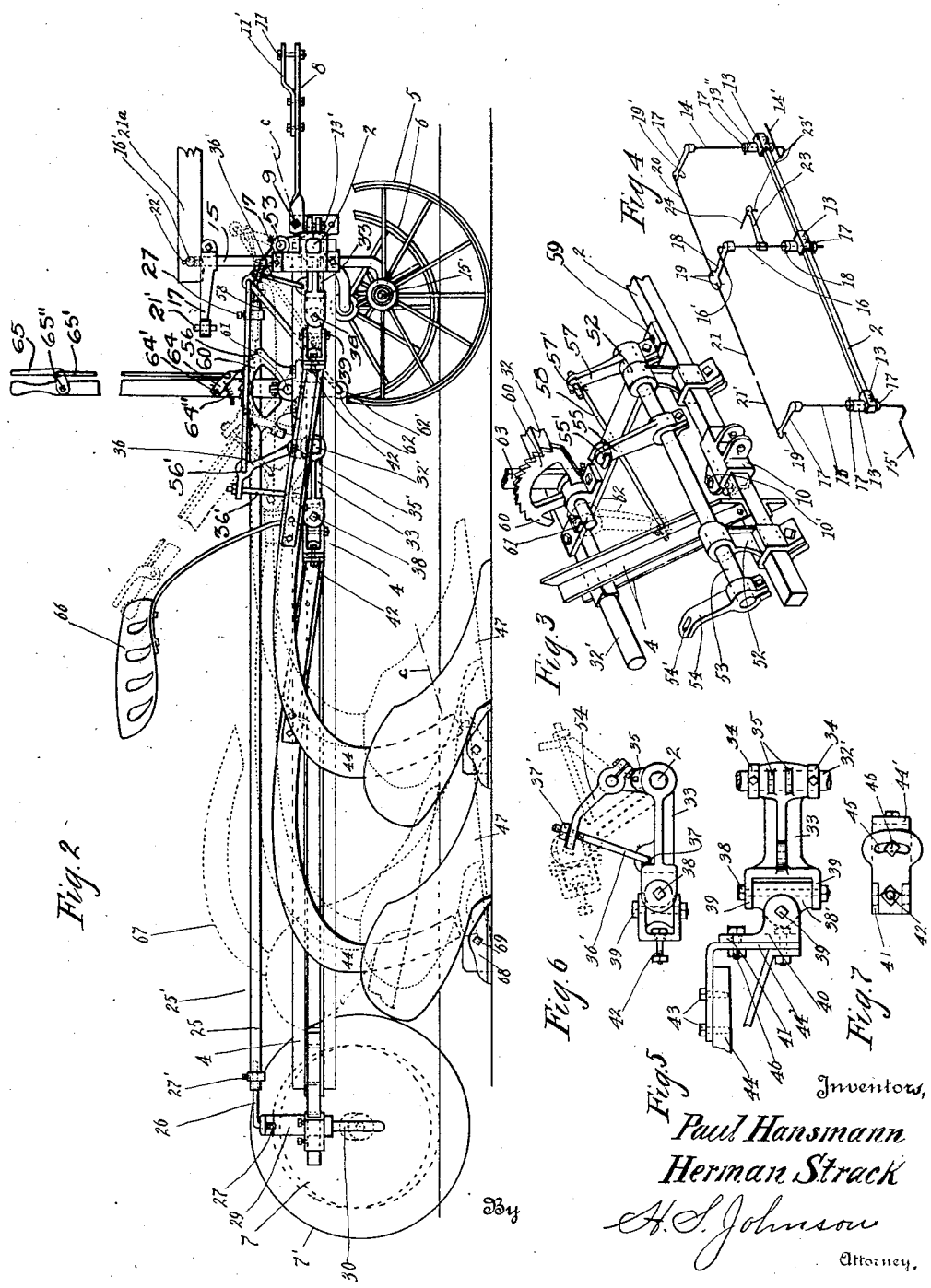

1,708,297

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE SAID HANSMANN.

PLOW.

Application filed February 14, 1923. Serial No. 618,988.

This invention relates to plows, and more particularly to gang plows equipped with anti side draft mechanism and having two or more bottoms, the invention having for one of its objects to provide an implement constructed in a manner to render each bottom of the plowing instrumentalities individually swingable to an appreciable degree with respect to the other or others, to thereby render it impossible for rocks to become wedged between adjacent plow shares, which latter incident is a common occurrence in the use of ordinary gang plows, wherein the shares are collectively rigidly joined together and mounted on the frame as a unit, and lifted or lowered as such.

A further object of the invention is the provision of new and novel connecting devices between the plows and the supporting frame upon which latter the operator is seated, whereby impact of the plows with firm obstructions during a plowing operation, is largely absorbed by the plows and is not directly communicated to the frame, thus largely eliminating the violent tilting of the latter commonly experienced in ordinary plows, and reducing the danger of throwing the operator. In many of the standard gang plows, the shares are firmly joined together and are usually suspended from the supporting frame to be swingable longitudinally thereof as by bails, locking means being in some cases provided to lock the plows in plowing position so that they cannot yield vertically. When a plow of this kind meets with a firmly embedded obstruction such as a rock, it is not an infrequent occurrence to have the obstruction wedge between adjacent shares, often resulting in bending of the plow beams, and thus rendering the plow temporarily useless. If the obstruction does not yield, the implement is violently jarred and the operator is often thrown from his seat. This often results in bodily injury and loss of valuable time in extricating the plow and removing the rock from the shares.

A further object of the invention is the provision of a gang plow wherein the plows are controlled to enter into or ride upon the surface of the soil, by automatically simultaneously oscillating the shares thereof while in engagement with the soil or during a plowing movement, as distinguished from common practice of bodily lifting the plow unit vertically out of the ground, whereby we secure a relatively quick entry of the shares into the ground and a gradual, instead of abrupt emergence therefrom.

This construction has the further advantage of eliminating the ponderous lifting mechanism required for lifting the heavy plow units bodily out of the ground.

A still further object of the invention is the provision of a novel mounting for the plows the construction and function of which is so interrelated that the shares of the plows not only may be easily and quickly drawn out of the soil or entered therein, but wherein the plows themselves will function as a brake when driving down grade to prevent the implement from running either by momentum or gravity into the horses, this being a common and dangerous thing in the use of standard two-bottom plows, inasmuch as there is no provision for retarding down-hill travel of the implement when the heavy plow unit is raised from the ground. The plows are further mounted and the implement frame novelly constructed with a view to accommodating a turning movement of the implement during a plowing or transporting operation.

A still further object of the invention is the provision of a gang plow so constructed as to enable the plows to be tilted so that the point of the share will be raised an appreciable distance from the ground, while the heel thereof will drag over the latter, in transporting the plow from place to place, so that field rubbish such as loose brush, weeds, and the like will collect in the jaw formed between the share and the ground, so that the share, when tilted preparatory to entering the ground for a plowing operation will ride over the accumulated rubbish. In the use of ordinary two bottom plows where the plows are suspended as a unit while traveling from place to place, field rubbish collects about the points of the plows and not infrequently fills the space between the plow share and beam to the extent that it must be removed by hand before the plow can be used. By tilting the plows as described, the rubbish collects under the plows and when packed sufficiently tight thereunder permits the plow to ride over it, the nose or point of the plow being thus kept constantly clear of weeds and being at all times ready for a plowing operation.

A still further object of the invention is the provision in plows, of novel dirigible wheeled anti-side draft devices dependent, to be steered, upon the movement of the drawing medium such as horses or a tractor, in combination with a plurality of independently mounted plows, novel construction being employed whereby the plows may be widely offset, without creating side-draft at the land-side of the shares, from the line of draft of the drawing medium toward the plowed ground to an appreciably greater extent than is now the compelled practice with ordinary gang plows, we thus securing the freedom of moving the evener landward to any desired degree necessary to render the horses comfortable.

It is well understood that the center of draft of a two bottom standard plow wherein the plows operate as a unit, is situated either coincident with the beam of the outside plow or just inside of same. In other words, the center of draft intersects approximately centrally longitudinally, the volume of earth turned by both mould boards which brings it somewhere near to or coincident with the outer plow beam.

Obviously (by inspection of Figure 1) the center of draft of a four horse evener, in an ordinary plow, must be offset a considerable amount landward to bring the outer horse into the furrow. It is this fact which forces the horses to head landward and pull at a considerable angle in a direction heading away from the furrow, thus unduly burdening the animals and causing abrasion of the hind legs where they contact with the traces. The center of draft of the evener tends constantly to move toward the furrow in its endeavor to align with the resultant center of draft of the two joined plows, and this tendency is overcome by the horses in pulling at an angle with respect to the furrow. Our improved side draft devices remove this tendency by transferring the forces to the soil by means of the ground element thereby relieving the horses.

Other objects and advantages will be pointed out at opportune times as this specification progresses.

The invention consists in the construction, combination, and arrangement of parts hereinafter described and claimed.

In the accompanying drawings forming part of the application:

Figure 1, is a plan view of a two bottom gang plow embodying our invention.

Figure 2, is a side view of same.

Figure 3, is a perspective view of a part of the implement or main supporting frame, showing parts of the plow raising mechanism mounted thereon.

Figure 4, is a diagrammatic perspective view of a part of the steering apparatus for steering the wheel supports of the main frame.

Figure 5, is a top view of the connecting device between the beam of the plow frame and the supporting frame.

Figure 6, is a side view of same.

Figure 7, is a view of a detail.

Figure 8, is a rear view of the rotary ground element at the rear of the frame, and Figures 9 and 10, are diagrams illustrating a turning movement of the implement.

The invention comprises a supporting frame generally designated by the numeral 1, hereinafter also referred to as the implement or main frame, and comprising a front cross member 2, a rearwardly extending side member 3 joined to the cross member, and a diagonal brace member 4 secured to both, the front, side, and brace members thus forming a triangular frame, the side member of which extends an appreciable distance rearwardly beyond the brace member and is curved outwardly in a direction away from the body of the frame for a purpose to be hereinafter described. Likewise, the cross member 2 extends laterally beyond the brace member, and carries at its free outer end a furrow wheel 5. At its inner or land side end it carries a land wheel 6, which latter is preferably somewhat smaller in diameter than the furrow wheel. The side member 3 of the frame carries at its rear end a ground cutting wheel 7.

Extending forwardly from the cross member 2 is an extension or knee 8, preferably formed of two rearwardly directed strap members, each pivotally supported by means of horizontally disposed pivot pins 9, to thereby render the knee swingable vertically. The pivots 9 in turn are supported by split sleeves 10, which sleeves are slidable on the cross member 2 and adapted to be clamped thereon by clamping bolts 10', whereby the knee is rendered adjustable longitudinally of the cross member, the latter being preferably square in cross section. The extension carries at its forward extremity a vertically disposed pivot pin 11, which pin passes through a lug 11' forming part of the knee to form a bifurcated end adapted to receive the main rear member 12 of a four horse evener, when the plow is drawn by horses, the single trees 12' of the evener being indicated diagramatically.

Secured to the cross member 2, one at each end thereof, and one intermediate its ends, are vertical shaft supports 13, each preferably formed with a horizontally disposed split sleeve portion surrounding the cross member 2 and being slidable longitudinally thereof and adapted to be clamped thereon as by means of the bolt 13' (Figures 2 and 4). The shaft supports are each further formed with a vertical journal hub 13'', adapted to receive for rotation a vertically disposed shaft. Rotatable in the journal support at the inner end of the cross member 2 and extending therethrough, is a shaft 14, said shaft being bent rearwardly at its lower extremity and then outwardly in parallelism with the cross member 2, thus forming a stub shaft 14' which rotatably supports the land wheel 6. The outer shaft support 13 rotatably supports a shaft 15, which latter extends therethrough and is bent rearwardly and then outwardly at its lower extremity to form a stub shaft 15', which latter rotatably supports the furrow wheel 5. Thus the wheels 5 and 6 are offset rearwardly with respect to the vertical axes of the shafts 14 and 15, and outwardly from said axes, so that a rotary movement of the shafts 14 and 15 will cause the wheels to swing respectively bodily through an arc in a horizontal plane to steer the implement frame 1 out of a normal straight ahead course.

The intermediate shaft support 13 supports for rotation the vertical shaft 16, which latter extends through said support and is bent at its top at right angles to form a tongue support 16'. The three parallel shafts 14 and 15, and 16 are provided with suitable collars 17, having suitable set screws 18, there being a collar above and below each of the shaft supports to hold the shafts respectively against longitudinal shifting in the hubs 13''. These collars also afford vertical longitudinal adjustment for the three shafts relative to the cross member 2.

Secured for circumferential adjustment to the three shafts 14, 15, and 16 adjacent the tops thereof, one for each shaft, are the rearwardly extending lever arms 17 and 18 (Figure 4). The adjustment for these levers is preferably secured by means of a split hub forming part of the lever and being provided with a pair of lugs 18' (Figure 1), through which passes the clamping bolt 18, whereby each lever may be firmly clamped to its respective shaft.

The lever arm 18 is formed at its outer extremity with a pair of laterally spaced, upwardly facing openings 19, while the levers 17 are likewise provided each with a single upwardly directed opening adapted to pivotally receive respectively, downturned hook ends 19' of tie rods 20 and 21 and 21'. The inner ends of the tie rods 20 and 21 have similar hook ends adapted to loosely extend through the openings 19 of the intermediate arm 18, whereby the three levers 17, 17, and 18 are pivotally connected in parallelism to move collectively in unison laterally to swing the wheels 5 and 6 through desired steering movements when the shaft 16 is rotated. Telescopically connecting adjacent ends of the rods 21 and 21' is the sleeve 21'' having set screws 21''' whereby the two rods may be adjustably connected.

Referring to Figures 1 and 2, 21'a designates a steering tongue which normally extends in parallelism with the line of draft 22—22 of the drawing medium, which line of draft intersects the pivot bolt 11 of the knee 8 by which the implement is drawn. The tongue is supported to swing vertically on the stub shaft 16' at the top of the shaft 16 and is suitably held positioned thereon as by means of the cotter pins 22' passing through said stub shaft. As the tongue extends between the second and third whiffle tree of the evener and between adjacent horses and is commonly hitched to the latter, turning movement of the horses will cause the tongue to swing laterally and impart a steering movement to the front wheels 5 and 6 of the implement. When drawn by a tractor the tongue may loosely extend between the pins b—b on the tractor to thus actuate the tongue during a turning movement.

Secured to the shaft 16, between the lever arm 18 and the shaft support 13, is a lever arm 23, which latter extends laterally preferably in parallelism with the cross member 2 and is secured to said shaft in a manner similar to the fastening means of the levers 17 and 18. The lever is likewise formed with an upwardly facing opening at its outer end to receive a down turned hook 23' of a telescoping rod member 24, which latter telescopically fits in the forward end of a tubular shift rod portion 25. The shift rod portion is similarly provided at its rear end with a telescoping rod member 26, likewise bent downwardly to form a hook 27 (Figure 2). Both of the rod members are adjustably held secured in the shift rod portion by means of set screws 27', so that the rod members may be longitudinally adjusted to vary the total length of the three assembled parts which may be termed a connecting rod.

The side member 3, as stated in the foregoing, is preferably of straight formation for a distance extending slightly beyond the rear end of the brace member 4, and then flares horizontally outwardly and rearwardly away from the body of the frame, and is formed preferably with a squared terminal stub end 28, upon which is adjustably secured to be longitudinally adjustable thereon, a vertically disposed hub 29, which latter has a suitable journal to receive for rotation a vertical shaft 30, the lower portion of said shaft being bent outwardly and upwardly to form an inclined stub shaft 30', upon which is mounted for rotation the ground cutting wheel or disk 7. Secured to the top of the shaft 30 is a lever arm 31, said lever arm extending inwardly and being provided with openings 31', each being adapted to loosely receive the hook end 27 of the rod member 26. Obviously, a reciprocatory movement of the connecting rod 25' will rotate the shaft 30 and thereby swing the disk wheel 7 bodily about the axis of the shaft 30, to change the direction of travel of the disk wheel, the latter being disposed at an angle, or, in other words, leaning inwardly with respect to the ground to enable the flange or disk 7' thereof to better resist any forces which may tend to swing the implement frame bodily landward away from the line of draft in a circular movement about the pivot 11.

The cross member 2, the side member 3, and brace 4, together with the knee 8 may be termed, as a whole, a horizontally disposed, rearwardly extending fulcrumed lever fulcrumed on the pivot bolt 11, on the evener or drawing medium of which the short arm or member carries the furrow wheel at its outer extremity or on the furrow side of the draft 22—22' of the drawing medium, and the long arm thereof carries the disc wheel at its rear end on the land side of the center of draft. This wheel may be termed a rotary ground element, adapted to cut into the soil and thus serve as an anchor against lateral movement of the specified fulcrumed lever to balance the resistance met with by the plow shares.

It will be noted that by the adjusting means 27' in the connecting rod 25', whereby to change the length of the latter, the direction of travel of the ground element may be changed when desired. Arranged parallel with the cross member 2 is the transverse shaft 32, the outer end 32' thereof extending beyond the brace member 4 and being round in cross section to form a bearing for rotatably supporting what may be termed an extension member 33, which latter extends horizontally rearwardly and is adapted to swing in a vertical plane at right angles to the shaft 32'. The extension member is held positioned on the shaft 32' by means of suitable set screwed collars 34. The extension member is formed at a point directly above the shaft 32' with a pair of vertical lugs 35, which pivotally support, by means of the pivot bolt 35', a rearwardly inclined link 36, which latter is swingable in a vertical plane and is formed with a rearwardly extending lug through which loosely extends the tie bolt 36', which in turn has pivotal connection 37 at its lower extremity with the extension member adjacent the free end of the latter. By means of the nut 37', threaded on the tie bolt, the angularity of the extension member relative to the ground may be altered at will, whereby the distance between the horizontal pivot 38 and the ground may be changed, said pivot being parallel with the shaft 32' and extending through a pair of laterally spaced lugs 39 forming the end of the extension member 33.

Pivotally supported on the pivot bolt 38 is the head 38', the latter having pivotal connection as by means of the vertical pivot bolt 39, with a bracket 40, whereby the latter is rendered swingable laterally. The bracket 40 is formed with a base 41 from which extend vertically alined spaced lugs adapted to receive the head 38' between them and through which extends the pivot bolt 39.

Extending at right angles through the base 41 of the bracket, and longitudinally of the frame 1, is a connecting bolt 42, which bolt extends through an extension device 43, one of which is attached to the forward end of each plow frame (Figure 5). This extension device is suitably secured to the plow frame as by means of the bolts 43' and is formed with a transverse arm member 44' extending horizontally at right angles to the plane of the plow frame an appreciable distance outwardly away from the implement frame to thereby offset the connecting bolt 42 with respect to the plow frame for a purpose hereinafter explained.

The base 41 of the bracket extends in a vertical plane inwardly and is perforated by an elongated opening 45, formed concentrically about the bolt 42. Extending through the slotted opening and the arm member 44', is an adjustment bolt 46 whereby the bracket 40 may be firmly bolted to the extension device. Upon loosening the bolts 42' and 46, the plow frame 44 may be rotated bodily about the bolt 42 for properly setting, or in other words, leveling the bottom 46' of the plow share 47, which latter is carried by the plow frame. It will be noted that this adjustment is located rearwardly of the pivots 38 and 39 where it is conveniently accessible.

The implement is designed with a view to keeping the shares of the plows as near to the pulling medium (such as horses) as possible for the purpose of better controlling the plows in a turning movement of the implement and keeping the long arm or side member 3 of the implement frame as short as possible. It is to be remembered that the plows are pivoted at their forward ends to permit them to swing freely laterally to an appreciable degree and that the plow shares in a plowing operation around a curve will traverse a path which does not occupy the same relative position to the curve traversed by the furrow wheel that its path of travel in a straight course occupies with respect to that of the furrow wheel. This is clearly illustrated by diagrams in Figures 9 and 10. In Figure 9, 48 designates a circular curve which is being traversed by the wheels 6 and 7. The furrow wall or land side of the previous furrow is represented by the curve 48' which is concentric with the curve 48, the furrow wheel 5 being indicated as traveling in the furrow.

It will be noted that the lines 48 and 48' are continued in a straight course at the left of the diagram. Between the lines 48 and 48' is a line 48'' running parallel therewith and representing in the straight course the path of the plow frame. In the straight course the implement is shown in its normal plowing position. We have found by experiment that as the implement turns a curve in a plowing operation, the plow frame will change its position relative to its point of pivotal securement on the implement frame to conform to the particular curve being traversed. The plow frame will swing toward the land side to a degree which is proportional to the distance between its point of pivotal securement for lateral movement 39 and the share. The angle between the plow frame and a radial line extending from the center of the curve being traversed to the pivot 39, as at $a$, becomes more acute as the distance between the share and pivot 39 is increased and the radius of the curve traversed is reduced. In the diagram the amount of inward movement of the share from the line 48'' is indicated approximately by the dotted line 50. As indicated, the line 50 gradually merges into the line 48'' as it approaches the straight course. To better illustrate how the variation increases with the length of the plow frame, I have shown in Figure 10 a similar diagram wherein the plow frame is double the length of the one shown in Figure 9. It will be noted that the space between the lines 48'' and 50 has approximately doubled. It thus follows that the shorter the plow frame, or, in other words, the nearer the plow shares may be brought to their points of pivotal securement for lateral movement, the less will be the variation of relative position of the curves traversed by the shares with respect to the curve traversed by the furrow wheel. When this variation is excessive, crescent shaped ridges of unplowed ground will result between each pair of furrows when two plows are used as here shown. By using short plow frames, the variation is so small as to be negligible as far as efficiency is concerned. But as the plows in the present invention drag on the ground when being transported from place to place, and as very short turns may be made to the right or left during such transportation and the landward swing of the shares therefore may be quite extensive, the implement frame requires certain novel features of construction to afford ample clearance to permit the plow frame to swing laterally and vertically to a degree sufficient to accommodate arising conditions.

To these ends we have constructed the frame in a manner to bring the pivotal connections of the forward plow, between the front wheels 5 and 6 close to a transverse line approximately coincident with the axes of rotation of said wheels, and have placed the plow lifting devices forward of said axis to accommodate which, the wheels have been offset rearwardly with respect to their vertical pivots. To keep the length of the side member 3 reduced to the minimum, and to avoid excessive space between the furrow wheel and the forward plow share, it is further desirable that the connection between the forward plow and implement frame be placed as described. Inasmuch as the lateral distance between the first and second plow frame is fixed by the size of the plow share, and the distance between the respective mould boards must be ample to take care of the soil being turned, we have found that when the forward plow frame is as short as the space between the forward mould board and the furrow wheel will permit and the connections of both plow frames are positioned inside or immediately adjacent either side of a right line 51 approximately intersecting the vertical pivots around which the wheel 5 and ground element 7 rotate, the variation between the curves traveled by the plow shares and the furrow wheel is reduced to a negligible quantity, while at the same time the plows operate efficiently around short turns. It is further essential that the plow connections be placed adjacent said line 51, to bring the downward pull on the main frame which is developed by the shares especially during introduction thereof into the soil, inside of the wheels 5 and 7 to reduce or avoid the tendency of said pull to raise the land wheel 6, it being obvious that if the plow connections were an appreciable distance outside of said line, the pivots 39 of the plows would constitute a fulcrum point about which the main frame would tend to swing vertically.

Thus we have found that very satisfactory results are obtained when the forward share is located laterally directly opposite the seat, while the rear share is positioned between the seat and the ground element or rear end of the implement frame. Further, the long reach of the extension members 33 permits the raising of the front ends of the plows to an appreciable extent which materially reduces the landward movement of the shares when the implement is being transported from place to place in that the effective length of the plow frame is much reduced by the inclination thereof.

For the purpose of raising the front ends of the plows the following mechanism is provided: Secured to the cross member 2 are brackets 52, wherein is journaled a rock shaft 53 disposed parallel with the cross member 2 and carrying at its outer free end a rearwardly inclined arm 54 having an upwardly facing opening 54'; through which extends the bolt 36' (Figure 6). This arm 54 functions in the same manner as the link 36, described in the foregoing, which in turn supports the bolt 36' whereby the extension member 33 may be raised or lowered relative to the ground. Thus, a rotary motion of the shaft 53 to the right will cause the extension 33 to be raised, as shown in dotted lines, thereby raising the front end of the forward plow.

Secured to the shaft 53 between the brackets 52 is an arm 55, having pivotal connection 55' with a reach rod 56, which latter in turn has pivotal connection at 56' with a link 36. Thus, the front ends of the plows may be raised or lowered by a rotary motion of the shaft 53. Obviously, the front ends of the plows may be adjusted by means of the nuts 37' to slightly tip the shares longitudinally to thereby change the bite thereof as desired.

Secured to the inner end of the shaft 53 is an arm 57, having pivotal connection 57' with a push rod 58. Extending longitudinally of the frame is a plate 59 which supports a toothed segment 60.

Concentric with the segment and supported on said plate is a shaft 61, which is parallel with the shaft 53 and carries rigidly a downwardly extending lever arm 62, which latter has pivotal connection 62' with the push rod 58. Supported on the shaft adjacent the toothed segment is an upwardly extending operating lever 63 which carries a pawl 64 supported on a pivot 64' and adapted to engage the teeth of the segment 60, said teeth facing rearwardly toward the plows.

A suitable spring 64" yieldingly holds the pawl in engagement with the teeth. A fulcrumed sublever 65, pivoted at the top of the main lever 63, has rod connection 65' with the pawl, whereby a rotary upward movement of the sub lever about its pivot 65" will cause the pawl to be lifted out of engagement with the teeth, so that the main lever may be pulled rearwardly to thereby rotate the shaft to lift the front ends of the plow, and so hold them by means of the pawl and toothed segment, which pawl and segment may be termed releasable holding means. A suitable seat 66 is secured to the main frame approximately midway between the land wheel and the ground element and directly over the long member 3 of the fulcrumed lever constituted by the implement frame. Thus, the weight of the operator is transferred directly to the ground element to assist in holding it in engagement with the ground.

It is an object of present invention to provide a plow in connection with anti side draft mechanism, having dirigible wheel support and being controlled by the movement of the drawing medium, and which will enable the plowing of a furrow contiguous with the previous furrow irrespective of the location of the line of draft of the drawing medium with respect to the previous furrow.

In operation the knee 8, which is swingable vertically, so that the frame is bodily supported by the front wheels, is so positioned on the implement frame as to bring one of the horses into the furrow, the side wall of which is indicated by the line 66'—66', the wheel 5 also running in the furrow, and being preferably adjusted to travel slightly landward and engage the wall of the previous furrow. As the plows are mounted on the frame in offset relation to the center of draft 22—22 of the pulling medium, it is obvious that the frame tends to rotate about the pivot 11 of the knee 8, thus tending to swing the ground element landward, or skid the front wheels 5 and 6. Since, however, the ground element is provided with a ground cutting disk flange 7' to cut appreciably deep into the ground, the element constitutes an anchor to oppose the forces tending to rotate the frame horizontally about the pivot 11, while the furrow wheel 6 engages the wall of the furrow and thus prevents skidding.

It will be noted, that if the ground element 7 be lifted out of engagement with the ground, the wheeled fulcrumed lever 1 may be swung about its fulcrum 11, and at the same time be moved about pivots 14 and 15 of its wheel supports. Thus the fulcrumed lever has pivoted rolling support intermediate the ground element and its pivotal connection with the drawing medium.

As the knee 8, is swingable vertically, the direct line of draft between the pivot 11, and the cross member 2,—and the stub shafts 14 and 15 does not change, said member and stub shaft constituting the front axle of the frame 1.

As indicated by the line c, in Figure 2, which line is coincident with line of draft 70, of the forward plow, the forces resisting forward movement of the implement are directed from the share to the pivots 9—9, of the knee 8, from which point the line of draft leads approximately parallel with the ground through the pivot 11. As, however, the line C, and the parallel portion of the draft line tend to establish a straight line between the mould board and the pivot 11; a down pressure is exerted on the front axle and its wheel supports. This down pressure causes the wheels to adhere to the earth, and this assists materially in opposing the tendency of the front wheels skidding. However, we have purposely assembled practically all of the raising mechanism over the front axle to thereby secure the benefit of weight to further assist in opposing a skidding movement.

As the ground element is capable of being adjusted longitudinally along the bar 28, the length of the long member of the fulcrumed lever may be changed to change the effective resistance of the ground element when desired. Because of this, or in other words, as the pull of the plows can always be balanced by the ground element, and as each individual plow is in itself balanced about its center of draft line 70, it makes no difference where the line of draft 22—22 is located, we having constructed the knee 8, to be reversible, so that the pivot 11, may be brought opposite the outer sleeve 10, as indicated in dotted lines in Figure 1. When thus reversed, three horses abreast may be used when light work is at hand.

If it should be desired to change the relative position of the center of draft of the pulling medium with regard to the plows, the knee 8 may be longitudinally adjusted on the cross member 2 as by means of the split sleeves 10 and their respective clamping bolts 10'. Normally the plows ride over the ground, as indicated in dotted lines in Figure 2, the front ends thereof being held an appreciable distance above the implement frame by the pawl 64 in engagement with the toothed segment 60. When it is desired to lower the plows for a plowing operation, the lever 63 is thrown forwardly, the pawl 64 having been previously disengaged by means of the sublever 65, whereby the push rod 58, through the medium of the arm 62, permits the rock shaft to be rotated by the frictional pull of the plows on the ground, until the plow bottoms are brought into operative position, as shown in full lines in Figure 2 of the drawings.

In this figure, the plows are shown (in dotted lines) riding with their heels on the bottom of the furrow, but it is to be understood that when cutting the first furrow, the furrow wheel 5 will roll upon the surface of the unplowed ground, at which time, when the plows are lowered at their front ends, the plow shares will be tilted with their points downward, as indicated by dotted lines at 67, it being noted that the plow shares are tilted to an appreciable degree to quickly enter the soil upon a forward movement of the implement.

When the plows are in idle position, as hereinbefore stated, they ride upon their heels, applicants having provided ordinary plow shoes 68 adapted to be bolted by means of the bolts 69 to the heel of the plow so that they may be conveniently replaced.

When it is desired to level the bottoms of the shares, the bracket 40 is temporarily loosened and adjusted as described in the foregoing. The bolt 42 is alined with the line of draft 70 of the plow frame to which it belongs, the line of draft 70 intersecting the neutral point on a balanced plow share. When plows are rigidly joined together as a unit as in ordinary two bottom plows, the line of draft for each plow is differently located than when each plow operates independently of the other, as is clearly set forth in the foregoing. That is to say, the center of draft of the combined plows is a resultant center of draft line based upon the combined resistance presented to all the shares. Applicants' plows are each unincumbered by faulty operation of the other, which is not the case in rigidly joined plows.

Applicants have taken advantage of this offset and utilized the space for the adjusting bolt 46 by which the plows may be leveled laterally when desired, it being common knowledge that upon repeated sharpening of the shares, the points of the plows are frequently distorted so as to require readjustment of the shares when replaced on the plow frame. The depth of the furrow is controlled by the control lever 63 whereby the operator selectively permits the pawl 64 to engage certain teeth of the segment according to the depth of the furrow desired.

By means of the adjustment in connection with the extension 33, the bolts 36' and the bolts 37', the shares may be leveled longitudinally. The steering tongue 21, as is the custom, extends between two of the horses, here shown extending between the inner and outer pair, a four-horse evener being provided. The tongue is suitably hitched (not shown) to the horses so that as the implement is drawn through a turning movement, the tongue will be accordingly moved to actuate the steering mechanism connected with the front wheels 5 and 6, as hereinbefore explained. The tongue, however, may be loosely supported on the rear of the tractor and controlled between the pins $b$—$b$, shown in dotted lines and carried by the tractor. Concurrently with the steering movement, the shift rod 25 will be actuated to impart a steering movement to the ground element, the latter being adjusted to cooperate with the front wheels to steer the device around a curve.

By having the plows swingable vertically and horizontally, any obstruction, such as rocks or roots, are effectively dodged, as shown at $d$ by dotted lines in Figure 1 of the drawings, in that each plow individually is free to either glide over the obstruction in paths that may diverge upwardly indicated by dotted lines or lead laterally around it, as distinguished from two bottom plows wherein the bottoms are firmly joined together. When one of these plows strikes an obstruction with its outer forward plow, the entire unit, including the frame, is thrown sidewise, while in applicants' plow only the individual plow is moved, which is free to ride around the obstruction and resume its plowing position.

Applicants have constructed several plows of this type and have found that when unyielding obstructions were met with, owing to the peculiar construction of the implement frame, the shock is not sufficient to dislodge the operator, as distinguished from gang plows having a unitary multiple bottom unit wherein the entire frame is skidded and not infrequently lifted vertically, thus dislodging the occupant.

By locating the pivotal connecting devices between the implement frame and the plow frames within the area of a triangle, bounded by a line extending approximately from the furrow wheel to the ground element, we are enabled to use plow frames, appreciably shorter than standard plow frames and which are thereby rendered promptly responsive to a lowering movement of the front ends of the plow to enter the soil smoothly and quickly, and likewise to a lifting movement to leave the soil without undue strain on the frame.

While we have shown our improved plow mounted in connection with a fulcrumed plow frame having anti-side draft devices, it is to be understood that the plows may be attached to ordinary gang plow frames. It will be noted the length of the plow frames are approximately twice the distance from the vertically pivotable connections of the plows with the frame.

It will be observed in the drawings and specifications that when one or more plows are pivotally supported upon a wheeled frame at one side of the draft line with the frame having fulcrumed connection with the drawing medium, there will be the tendency caused by the pulling strain of the drawing medium and the plowing strain exerted through the plows to draw the pivotal support of the plow or plows and the fulcrumed connection of the frame of the drawing medium into alignment, throwing the frame out of the normal position and bringing a side-draft upon the drawing medium as upon the horses when horses constitute the drawing means. This is counterbalanced in my construction by the trailing ground resisting element which as set forth, can be optionally held in rigid relationship with the frame and line of draft. It will be apparent further that by being able to simultaneously and in unison turn the front supporting wheels of the frame and the ground resisting element into diverging positions by the drawing medium, this equilibrium or counterbalancing of pulling and plowing strain above set forth is maintained in changing the line of travel of the plow mechanism as in turning corners.

A further very desirable attribute of my construction, as shown and set forth, is in the free movable character of the plow beams in connection with the means for lifting the front pivotal support for the beams, in combination with the lateral offsetting of the front end of the beams with reference to the supporting pivots. Through these features of construction, we secure a structure wherein each plow may be tilted to ride over obstructions such as rock, may swing upwardly in an unrestricted manner to pass thereover, and may swing laterally freely to pass therearound thus preventing wedging of such obstructions between adjacent plows. By means of the lateral offsetting of the front ends of the plow beams, the normal land side pressure is diminished.

Among the advantages of our improved construction is the relieving of the side draft upon the drawing medium, as the horses; the placing of the driver in a position out of danger with respect to the plows as they are thrown laterally or upwardly by obstructions; locating the driver's position upon the opposite side from the line of draft of the plows, and the ease with which the mechanism may be operated by the driver. It is possible with our construction that the mechanism can be operated by a child without danger. These and other advantages over the ordinary types of plowing mechanisms will be apparent.

We claim:

1. In a plow, the combination of a wheeled frame having a fulcrum pivot whereby it is adapted to be attached to a drawing medium to be drawn thereby, the rear wheel of said frame being shaped to cut into the ground during plowing operation and being located on the landward side of the center of draft of the drawing medium, a plurality of plows located on the furrow side of the aforesaid center of draft and having pivotal connection at their front ends with said frame to swing vertically and laterally thereon, each of the pivotal connections including releasable holding means, operatively connected to said pivotable joints to flex them upwardly and so hold them to thereby raise the front ends of the plows when said means is actuated, and steering mechanism including a laterally swingable steering tongue capable of being operatively connected to the drawing medium to receive a steering movement therefrom when the latter is diverted from a straight course, said mechanism being operatively connected to all of the wheels to impart a steering movement to each responsive to actuation of said tongue, and adjustment means forming part of said steering mechanism whereby the specified rear wheel of the frame may be adjusted to change its direction of travel irrespective of the other wheels.

2. A plow comprising a frame, supporting wheels at the front, a pivoted side-draft resisting ground engaging element supporting the rear end of said frame, means for holding said element rigid with the frame, draft means for the frame, a pivotally mounted member on the frame off-set from the line of draft, means for raising and lowering said member, a freely movable plow, and connecting means between the plow and said member permitting vertical and horizontal movement of said plow.

3. A plow comprising a frame, supporting wheels at the front, a pivoted side-draft resisting ground engaging element supporting the rear end of said frame, means for holding said element rigid with the frame, draft means for the frame, a pivotally mounted member on the frame offset from the line of draft, means for raising and lowering said member, a freely movable beam plow with an outwardly offset front end, and connecting means between said offset end of the plow and said member permitting vertical and horizontal movement of said plow.

4. A horse drawn plow comprising a frame, supporting wheels at the front, a pivoted flanged wheel for resisting side-draft supporting the rear end of said frame, means for holding said element rigid with the frame, draft means for the frame, a pivotally mounted member on the frame off-set from the line of draft, means for raising and lowering said member, a freely movable plow, and connecting means between the plow and said member permitting vertical and horizontal movement of said plow.

5. A horse drawn plow comprising a substantially triangular frame, swivelled supporting wheels at the front, a side-draft resisting flanged wheel pivotally supporting the rear end of the frame, means for holding said wheel rigid with the frame, draft means for the frame, crank arms pivotally mounted on the frame and off-set from the draft, means for manually securing said arms in adjusted positions, beam plows freely movable, and connecting means between the front ends of the beams and the crank arms permitting vertical and horizontal movement of said plows.

6. A horse drawn plow comprising a frame, swivelled supporting wheels at the front, a pivoted side-draft resisting ground engaging element supporting the rear end of said frame, draft-means for the frame, a beam plow having horizontal and pivotal support on the frame at one side of the line of draft to be freely movable horizontally and vertically, manually actuatable means for raising the pivoted front end of the plow, and means controlled from the draft means for simultaneously swinging the front supporting wheels of the frame and the ground engaging element for the purpose set forth.

7. A plowing structure comprising a frame, a pair of dirigible wheels at the front and a pivoted side draft resisting wheel at the rear, connecting means for said wheels, a trailing beam plow having its front end connected to the frame for free movement horizontally and vertically, and draft means off-set from the plow and so connected to the frame and wheels that turning movement thereof angles the front wheels and the rear wheel reversely.

8. A plowing structure comprising a wheeled frame, an oscillatable arm extending rearwardly from said frame, a beam plow, means for connecting the beam of the plow to said arm for free movement vertically and horizontally, a seat on the frame, manually operated means near the seat for oscillating the arm to tilt the plow independently of the frame, and draft means for the frame off-set from the plow beam.

9. A plowing structure comprising a frame, supporting means at the front, a side-draft resisting ground engaging member pivotally supporting the rear end, means to optionally hold said member rigid with the frame, beam plows of equal length and width, means for connecting said plows to the frame in equalized stepped relation offset from the draft, said connecting means being constructed to permit said plows to freely swing vertically and horizontally and to tilt upon their heels, manual means for controlling the tilting movement, and draft means for said frame.

In testimony whereof we affix our signatures.

PAUL HANSMANN.
HERMAN STRACK.